US006054987A

United States Patent [19]

Richardson

[11] Patent Number: 6,054,987
[45] Date of Patent: Apr. 25, 2000

[54] METHOD OF DYNAMICALLY CREATING NODAL VIEWS OF A MANAGED NETWORK

[75] Inventor: David E. Richardson, Fort Collins, Colo.

[73] Assignee: Hewlett-Packard Company, Palo Alto, Calif.

[21] Appl. No.: 09/087,338

[22] Filed: May 29, 1998

[51] Int. Cl.[7] .................................................. G06F 3/14
[52] U.S. Cl. ........................ 345/348; 345/440; 345/356; 345/352; 345/349; 345/969; 709/223; 709/224
[58] Field of Search .................................. 345/969, 357, 345/349, 356, 440, 348, 968, 352; 709/223, 224, 226

[56] References Cited

U.S. PATENT DOCUMENTS

| 5,276,789 | 1/1994 | Besaw et al. ............................. 345/969 |
| 5,295,244 | 3/1994 | Dev et al. ................................ 345/357 |
| 5,517,606 | 5/1996 | Matheny et al. ......................... 345/352 |
| 5,530,796 | 6/1996 | Wang ......................................... 35/356 |
| 5,664,133 | 9/1997 | Malamud et al. ........................ 345/352 |
| 5,784,583 | 7/1998 | Redpath ................................... 345/353 |
| 5,828,376 | 10/1998 | Solimene et al. ........................ 345/352 |
| 5,910,803 | 6/1999 | Grau et al. ............................... 345/969 |

FOREIGN PATENT DOCUMENTS

WO99/30423 12/1997 WIPO .

*Primary Examiner*—Raymond J. Bayerl
*Assistant Examiner*—Thomas T. Nguyen

[57] ABSTRACT

A methodology for dynamically creating, modifying, and deleting nodal views of a managed network environment is presented. The methodology stores the group view information in a file that may be edited by a user. This allows the user to be able to dynamically configure group view information. The methodology also provides menubars, popup menus, and toolbar that are context sensitive to the group view that is selected.

15 Claims, 5 Drawing Sheets

METHOD OF DYNAMICALLY CREATING NODAL VIEWS OF A MANAGED NETWORK

FIELD OF THE INVENTION

The present invention relates generally to network management, and more particularly to dynamically creating nodal views of a managed network environment.

BACKGROUND OF THE INVENTION

The Simple Network Management Protocol (SNMP) and Common Management Information Protocol (CMIP) are network management protocols that provide a generic mechanism by which different manufacturers' equipment can be monitored and controlled from a management system, such as a UNIX server. A network component on a managed network can be monitored and controlled using a management protocol to communicate management information between network components on the network. A network component includes networked personal computers, workstations, servers, routers, and bridges. There exist several key areas of network management including fault management, configuration management, security management, performance management, and accounting management. With the ability to instruct a network component to report events and the ability to start processes on a network component, the network can be manipulated to suit changing conditions within a system.

A key mechanism by which various network devices communicate with a management system is via SNMP traps or CMIP events. Hereafter, "events" will be used to refer to either SNMP traps or CMIP events. Events allow for unsolicited notifications to be sent from one network device to another. This same mechanism can be used for communication between various cooperating software components within the management system.

There are several software products that receive events and allow a user to manage network devices. One of these products, Network Node Manager (NNM) from Hewlett-Packard Company of Palo Alto, Calif., enables a user to manage network devices using a graphical user interface (GUI) along with graphically representing relationships between network devices. Hereafter "NNM" will be used to generically refer to a product that receives events and allows a user to manage network devices, such as Network Node Manager. From the NNM console, a user is able to discover and display all of the network devices on the network and to proactively monitor and manage all servers on the network. This makes it easy to determine the network status or to follow the path of a failed print job, for instance, and determine the point at which it failed. Because it is easy for a user to see how a network is configured, it is easy to manage network devices and optimize the configuration. For instance, a configuration may be optimized by balancing the number of print queues per print server or the number of print servers per file server. Any network device may be managed by NNM such as NetWare file servers, print servers, print queues, and printers. During initialization of NNM, network devices are automatically discovered and added to a topology database. Each network device is graphically represented by an icon on the NNM console.

All events are assigned a default severity which can be overridden by the user. NNM utilizes registration files for user configurable information. The severity level of each event that is received by NNM that corresponds to a particular network device is represented by a unique color. The severity level of a network device is indicated on the NNM console by the color of the network device's icon. A critical event is depicted with a red icon. For instance, by default, a critical event is indicated to the user when a network device icon on the NNM map changes color to red indicating a critical status related to that network device. Thus, the current status of the entire network can be easily inspected by a user using the color status indications of the network device icons.

Using NNM, a user can proactively monitor and manage all network devices on a managed network. A user can monitor the state on a network device over various periods of time by keeping trend data. A user can use trend thresholds to troubleshoot problems on network devices or to plan future expansion of network devices, such as increasing volume and disk sizes, or increasing the number of users allowed access to a server at one time.

Network printers are graphically represented with a printer icon representing each of the network printers on the network. A user can remotely determine the "health" status of any of the network printers visually. The LED status on the network printer can be browsed to determine if the printer needs to be serviced or if human intervention is required. For instance, it can determined if a printer has any of the following problems: Out of paper; Out of ink; Paper jam; Door open; Toner low; Printer problem; and Bin full.

Servers are graphically represented with a server icon representing each of the servers on the network. A server running the appropriate agent software may be managed by a user from the NNM console. A server running the appropriate agent software responds to management data requests from the NNM console and transmits alarms from the server to the NNM console. This makes it possible for NNM to display real-time server performance and configuration data on those servers and to monitor key performance statistics including: CPU utilization; number of users; number of connections; memory usage and configuration; installed software; and disk and volume usage. Thresholds can be set on these parameters to cause an SNMP trap, or they can be graphed by NNM to evaluate history or trends. Parts of a server may also be viewed when troubleshooting a problem. Viewing components of a server's configuration (the network interfaces, for example) might help solve a critical problem with the server.

Server faults may be managed by monitoring key parameters of the servers, such as CPU load and available disk space, as well as noting significant events, such as NetWare Loadable Modules (NLMs) being unloaded or trustee rights changing. These conditions may be monitored directly at the servers and passed to the NNM via SNMP traps. For file servers, a user can obtain current and historical trend data and set alarm thresholds for trend parameters so that the user is notified when a threshold is passed.

Novell's NetWare Management Agent (NMA) Management Information Base (MIBs) and trap definitions are integrated into NNM. NNM may be configured to integrate the NMA traps with associated Novel "NetExpert" help text. When an SNMP alarm is sent to an NNM console, the alarm can be reviewed for more detailed help text describing the problem. The user can also followed detailed instructions that guide the user through a series of steps to resolve the problem discovered by the NMA agent.

Referring to FIG. 3, IP-centric group views 60 for graphically displaying network devices, according to the prior art, is shown. User interface 62 contains a representation of the network indicated by IP Internet icon 64. Double-clicking the IP Internet icon 64 will result in the presentation of user interface 66 containing the group views of the network indicated by NW-Servers:GOTO icon 68 and NT-Servers:GOTO icon 70. Double-clicking on NW-Servers:GOTO icon 68 will result in the presentation of user interface 72 containing the NW-Servers related network devices discovered by NNM during initialization. Three NW-Servers related network devices are shown each representing individual network devices: nwstrn0a icon 74, nwstrn0b icon 76, and nsmdem3 icon 78. This group view configuration is considered IP-centric (Internet Protocol Centric) because during network device discovery all network devices are initially contained in a single group view that is presented by double-clicking on the IP Internet icon 64. A user may manually construct basic group views such as NW-Servers and NT-Servers as shown as NW-Servers:GOTO icon 68 and NT-Servers:GOTO icon 70, respectively.

NodeView is a product that enhances products that receive events and allow a user to manage network devices such as NNM. Using NodeView, related network devices are automatically grouped into maps represented by group icons. Group views are hardwired into the NodeView code itself. Referring to FIG. 4, device-centric group views 80 for graphically displaying network devices, according to the prior art, is shown. User interface 82 contains a representation of the network on top of background 91, a map of the United States. The top-level network is indicated by Internet icon 84. The group views of the network are represented by NW-Servers icon 90, NT-Servers icon 92, Web-Servers icon 86, HP-Printers icon 88, and DMI-Clients icon 94. This group view configuration is considered device-centric because during network device discovery related network devices are automatically grouped into group views represented by group view icons. Double clicking on a group icon will explode a map, hereafter referred to as a "group view", showing all the related devices that were previously discovered in the topology database. For instance, double-clicking on NW-Servers icon 90 will explode to a NetWare Servers group view showing all of the NetWare servers that were discovered in the topology database. A group view of related devices provides a user with a simple way to monitor and launch applications using the menubar and NetWare tool launcher from a single view of the managed environment. The menubars, popup menus, and toolbar remain consistent for each of the group views provided by NodeView.

In the prior art, the group views are hardwired into the NodeView code itself. This means that a NodeView user can not select his/her own choices for group views nor dynamically update this selection. There is therefore an unmet need in the art to allow a user to be able to dynamically configure group view information. Additionally, the menubars, popup menus, and toolbar are not individually configured for a selected group view, but rather remain consistent regardless of whether an item is only applicable for certain group views and meaningless for others. There is therefore an unmet need in the art to allow the menubars, popup menus, and toolbar to be context sensitive to the group view.

SUMMARY OF THE INVENTION

It is therefore an object of the present to allow a user to be able to dynamically configure group views.

It is another object of the present to allow the menubars, popup menus, and toolbar to be context sensitive to the selected group view.

Therefore, according to the present invention, the group view information is stored in a file that may be edited by a user using a graphical user interface. This allows a user to be able to dynamically configure group view information. Group view attributes that may be edited include: the name of the group view; the background graphic image; the symbol type; and the context. Additionally, the present invention provides menubars, popup menus, and toolbar that are context sensitive to the group view that is selected. This means that when a menubar, popup menu, or toolbar is selected within a group view, only those items that are registered to that group are shown.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

The present invention provides several advantages over the prior art. The present invention provides an advantage over the prior art's hardwired group views. The present invention stores the group view information in a file that may be edited by a NNM user. This allows a user to be able to dynamically configure group view information. Additionally, the present invention provides an advantage over the prior art's static menubars, popup menus, and toolbar. The present invention provides menubars, popup menus, and toolbar that are context sensitive to the group view that is selected by the user.

In the present invention the group view information is stored in a file that may be edited by a NNM user using a graphical user interface. This allows a user to be able to dynamically configure group view information. Group view attributes that may be edited include: the name of the group view, the background graphic image, the symbol type, and the context.

The present invention provides menubars, popup menus, and toolbar that are context sensitive to the group view that is selected. NodeView utilizes registration files for context sensitive group views. This means that when a menubar, popup menu, or toolbar is selected within a group view, only those items that are registered to that group are shown.

Figure 1A:
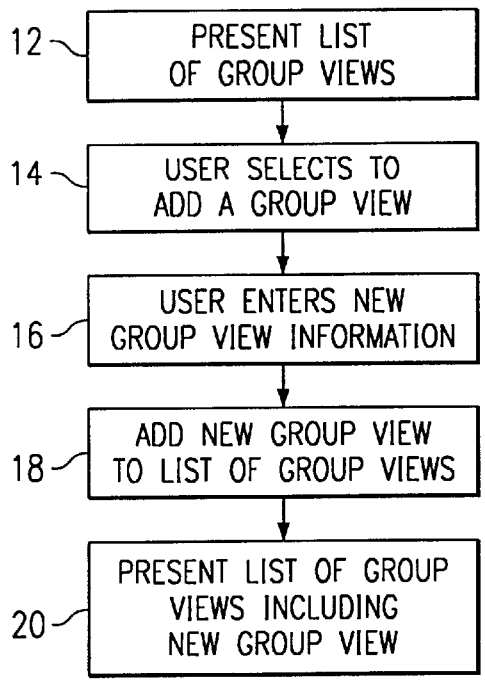
FIG. 1a illustrates a flow chart of dynamically adding group views, according to the present invention.

Referring to FIG. 1a, a flow chart of dynamically adding group views 10, according to the present invention, is shown. Initially, the user is presented with a list of group views at Block 12. The user selects to add a group view at Block 14. The user enters new group view information at Block 16. At Block 18 the new group view is added to the list of group views. Finally, at Block 20, the user is presented with a list of group views including the new group view.

Figure 1B:
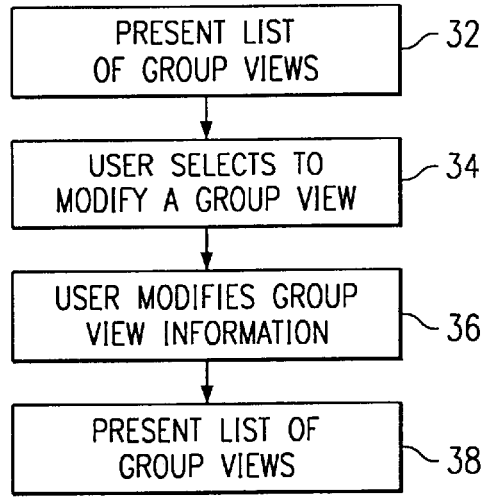
FIG. 1b illustrates a flow chart of dynamically modifying group views, according to the present invention.

Referring to FIG. 1b, a flow chart of dynamically modifying group views 30, according to the present invention, is shown. Initially, the user is presented with a list of group views at Block 32. The user selects to modify a group view at Block 34. The user modifies the group view information at Block 36. The user is again presented with a list of group views at Block 38.

Figure 1C:
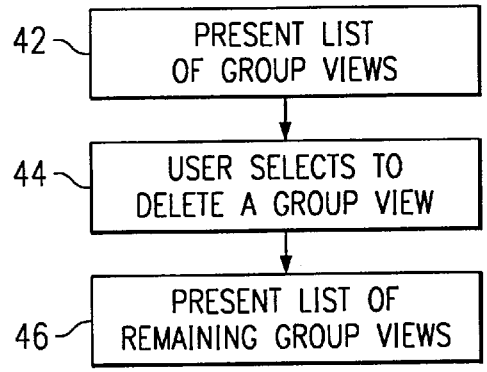
FIG. 1c illustrates a flow chart of dynamically deleting group views, according to the present invention.

Referring to FIG. 1c, a flow chart of dynamically deleting group views 40, according to the present invention, is shown. Initially, the user is presented with a list of group views at Block 42. The user selects to delete a group view at Block 44. The user is presented with a list of the remaining group views at Block 46.

Figure 2:
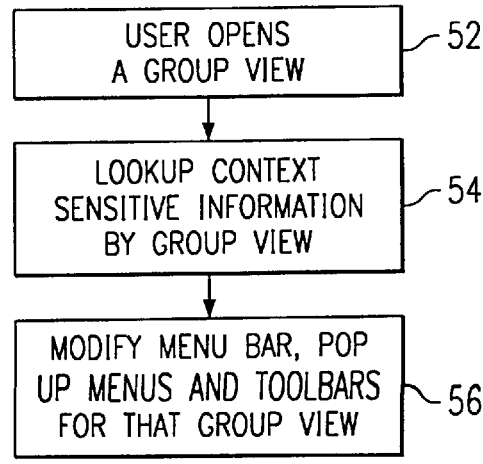
FIG. 2 illustrates a flow chart of the context sensitive menubars, popup menus, and toolbar, according to the present invention.
Figure 3:
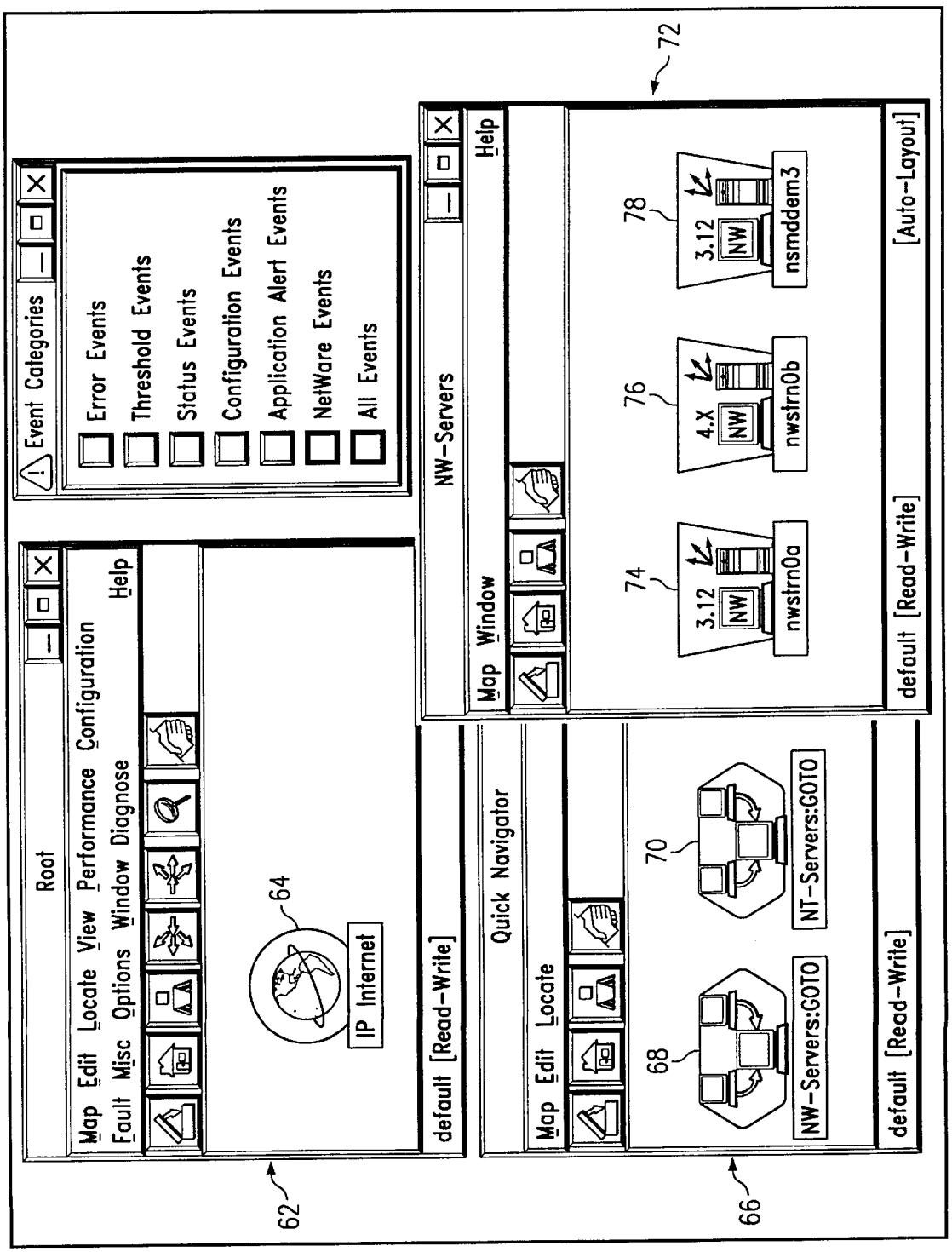
FIG. 3 illustrates IP-centric group views for graphically displaying network devices, according to the prior art.
Figure 4:
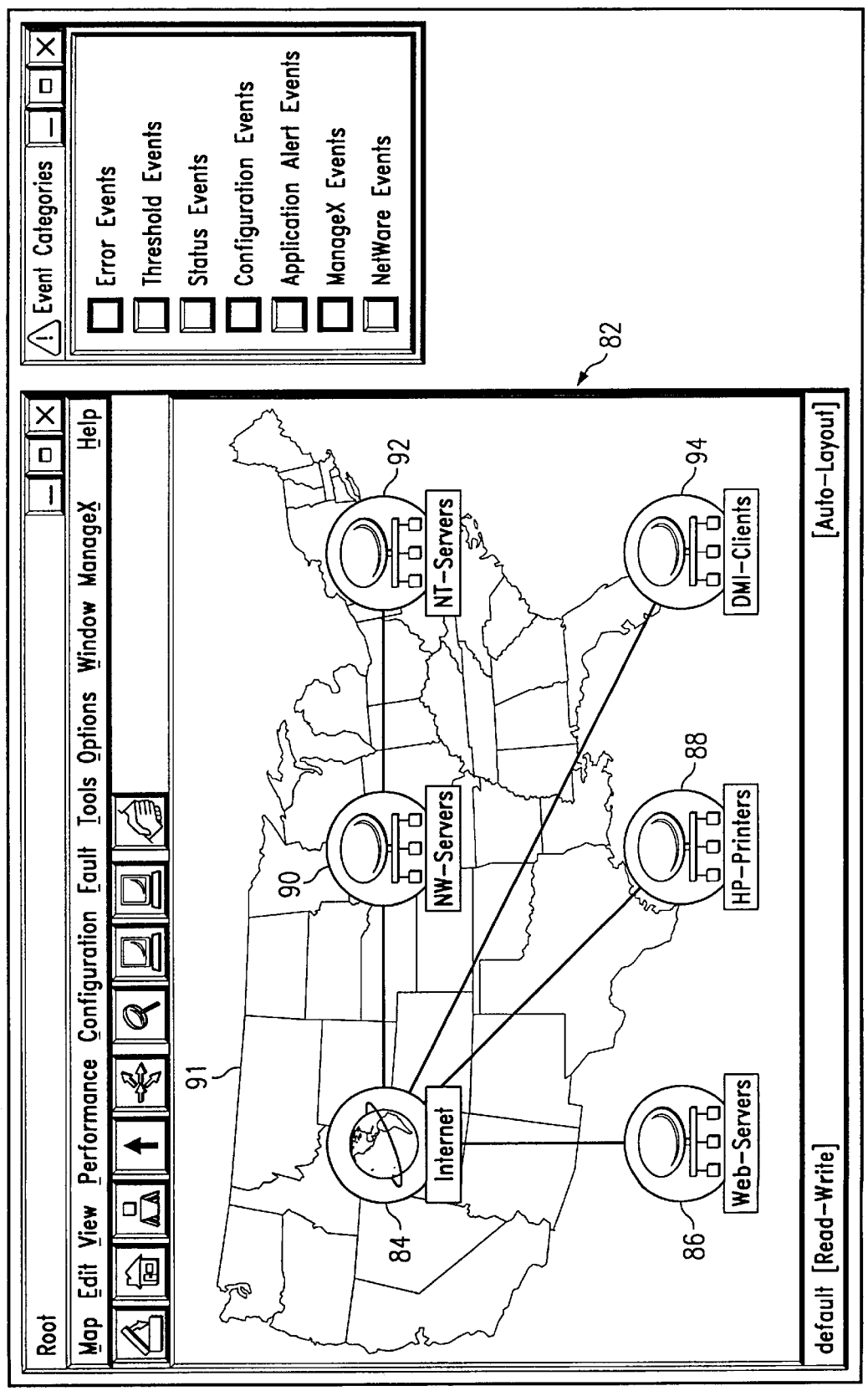
FIG. 4 illustrates device-centric group views for graphically displaying related network devices, according to the prior art.

Referring to FIG. 2, a flow chart of the context sensitive menubars, popup menus, and toolbar 50, according to the present invention, is shown. The user opens a group view, at Block 52, by double-clicking on the group view icon. A lookup is performed on a NodeView registration file for the context sensitive information for that group view at Block 54. The menubars, popup menus, and toolbar for that group view are modified at Block 56.

Figure 5:
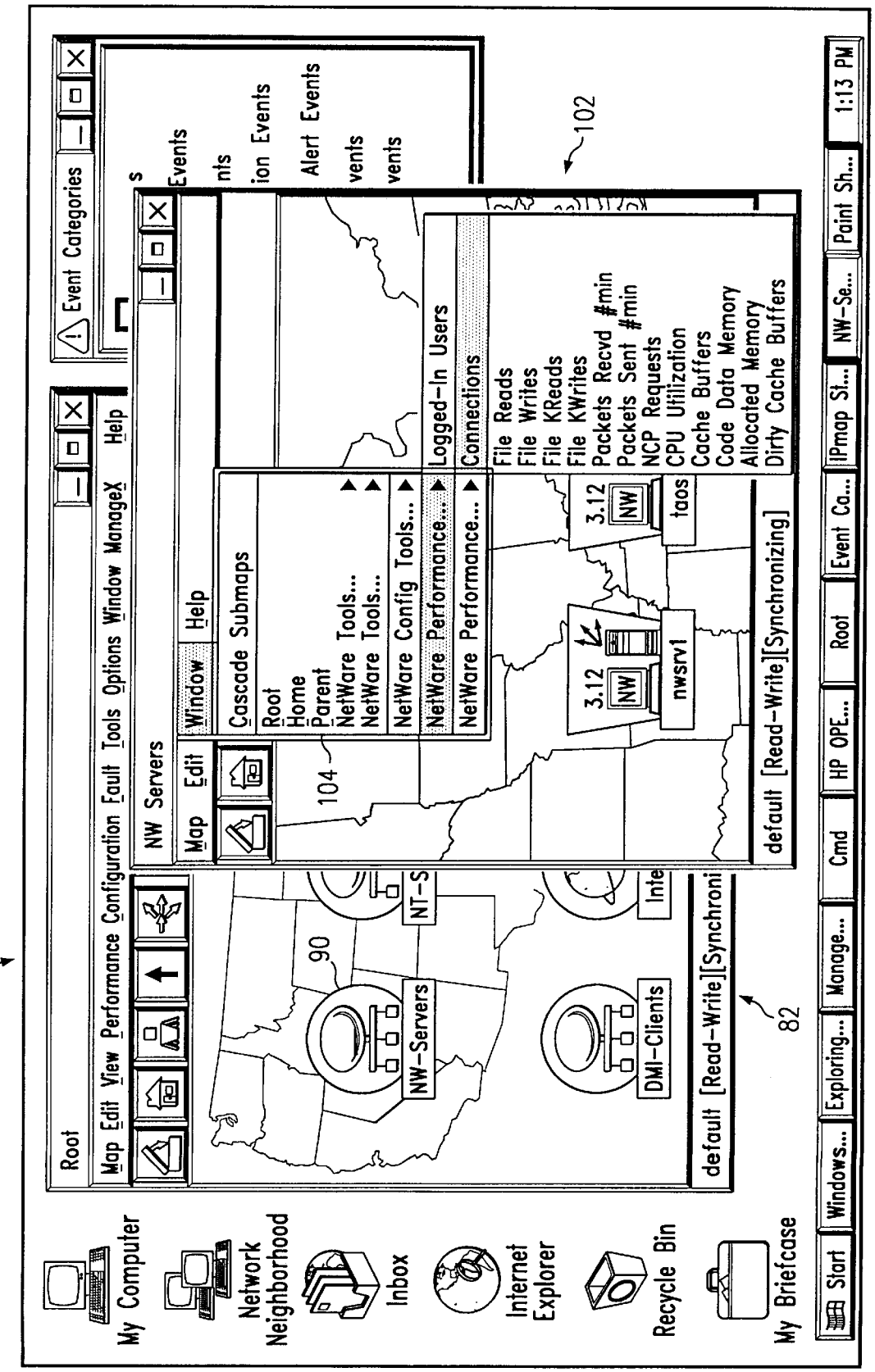
FIG. 5 illustrates a menubar that is context sensitive to the group view that is selected, according to the present invention.

Referring to FIG. 5, a menubar that is context sensitive to the group view that is selected 60, according to the present invention, is shown. Double-clicking on NW-Servers icon 90 will result in the presentation of user interface 102 containing the NW-Servers related network devices discovered by the NodeView enhanced NNM during initialization. Selecting menubar 104 will result in the presentation of a menubar that is context sensitive to the group view selected, in this case NW-Servers.

Figure 6:
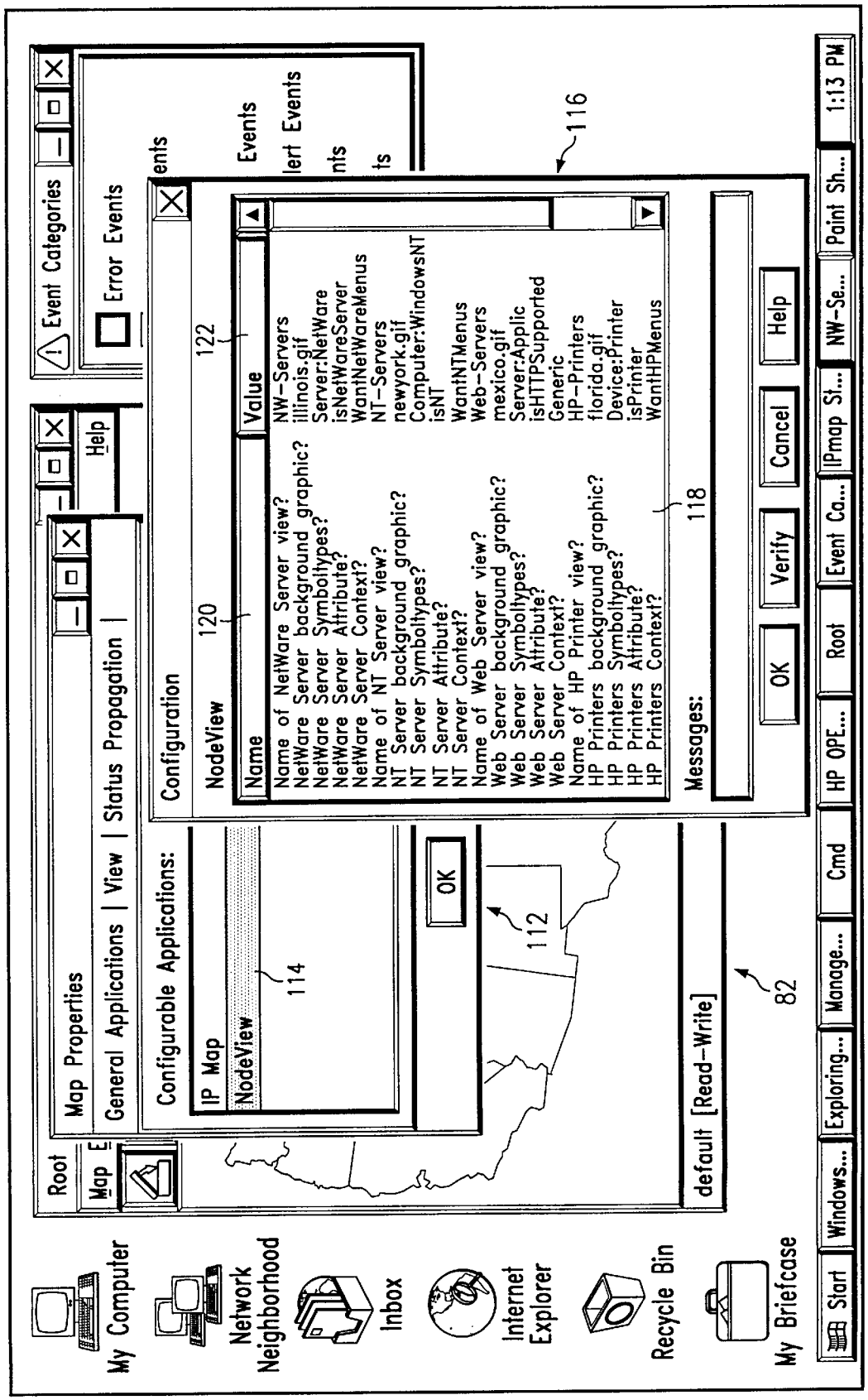
FIG. 6 illustrates editing group view information that is stored in a file using a graphically interface, according to the present invention.

Referring to FIG. 6, an illustration of editing group view information, stored in a file, using a graphical user interface 110, according to the present invention, is shown. Selecting map properties from the menubar will result in the presentation of user interface 112 containing Configurable Applications selection list 114. Selecting NodeView from the Configurable Applications selection list 114 will result in the presentation of user interface 116 containing the group view attribute list 118. Group attributes are listed by name 120 and value 122. A group view attribute may be edited by selecting a group view attribute from the group view attribute list 118 and modifying that group view attribute's value.

While the invention has been particularly shown and described with reference to a preferred embodiment, it will be understood by those skilled in the art that various changes in form and detail may be made therein without departing from the spirit and scope of the invention.

What is claimed is:

1. A method for allowing a user to create group views of a managed network environment information by dynamically manipulating a user interface of a windows-based computer environment, comprising:

displaying a list of a plurality of group views within the user interface, each group view of the plurality of group views representative of a grouping of network components and containing a plurality of group view attributes, defined by a plurality of attribute values in a group view attribute list stored in a database, that define the grouping of network components of the group view, wherein a user can dynamically change one or more group views of the plurality of group views by changing one or more group view attributes of the plurality of group view attributes stored in the database; selecting to add a new group view to the plurality of group views;

the user entering a plurality of group view attributes of the new group view into a new group view attribute list via the user interface and assigning an attribute value to each group view attribute of the plurality of group view attributes of the new group view in the new group view attribute list and storing the plurality of group view attributes and associated attribute values in the new group view attribute list in the database;

adding the new group view to the plurality of group views; and displaying an updated list of a plurality of group views that includes the new group view.

2. The method of claim 1, wherein the plurality of group view attributes comprise a group view name, a background graphic image, and a symbol type.

3. The method of claim 1, wherein selecting to add the new group view is accomplished by manipulating one or more approach controls of the user interface.

4. A method for allowing a user to modify group views of a managed network environment information by dynamically manipulating a user interface of a windows-based computer environment, comprising:

displaying a list of a plurality of group views within the user interface, each group view of the plurality of group views representative of a grouping of network components and containing a plurality of group view attributes, with each group view attribute of the plurality of group view attributes defined by an attribute value in a group view attribute list stored in a database, that define the grouping of network components of the group view, a user selecting to modify a group view of the plurality of group views through the user interface;

opening the group view selected by the user;

the user modifying the group view selected by the user via the user interface, comprising:

presenting to the user via the user interface the group view attribute list of the group view selected by the user;

the user selecting via the user interface one or more group view attributes of the plurality of group view attributes to modify;

the user modifying via the user interface each attribute value of the selected one or more group view attributes in the group view attribute list to generate a modified group view attribute list of the modified group view;

saving the modified group view attribute list to the database; and displaying an updated list of a plurality of group views that includes the modified group view of the plurality of group views.

5. The method of claim 4, wherein the plurality of group view attributes comprises a group view name, a background graphic image, and a symbol type.

6. The method of claim 5, wherein selecting to modify the group view is accomplished by manipulating one or more approach controls of the user interface.

7. The method of claim 4, wherein after opening the group view selected by the user, comprising:

determining a context sensitive information of the group view selected by the user, comprising:

performing a lookup operation on a registration file of the group view selected by the user; and modifying one or more user interface mechanisms of the user interface to conform with the context sensitive information of the group view selected by the user, comprising:

displaying only one or more items of the one or more user interface mechanisms that are contained in the registration file so that the one or more interface mechanisms conform with the context sensitive information of the group view selected by the user.

8. A method for allowing a user to delete group views of a managed network environment information by dynamically manipulating a user interface of a windows-based computer environment, comprising:

displaying a list of a plurality of group views within the user interface, each group view of the plurality of group views representative of a grouping of network components and containing a plurality of group view attributes, defined by a plurality of attribute values in a group view attribute list stored in a database, that define the grouping of network components of the group view, wherein a user can dynamically change one or more group views of the plurality of group views by changing one or more group view attributes of the plurality of group view attributes stored in the database;

a user selecting to delete a group view of the plurality of group views through the user interface;

deleting the group view of the plurality of group views selected by the user; and displaying an updated list of a plurality of group views that does not include the deleted group view.

9. The method of claim 8, wherein the plurality of group view attributes comprises a group view name, a background graphic image, and a symbol type.

10. The method of claim 8, wherein selecting to delete the group view is accomplished by manipulating one or more approach controls of the user interface.

11. A method for providing context-sensitive group views of managed network environment information using a windows-based computer environment, comprising:

a user selecting to open a group view of a plurality of group views through a user interface, wherein each group view of the plurality of group views has a registration file;

opening the group view of the plurality of group views;

determining a context sensitive information of the group view of the plurality of group views, comprising:

performing a lookup operation on the registration file for the group view selected by the user; and modifying one or more user interface mechanisms of the user interface to conform with the context sensitive information of the group view selected by the user, comprising:

displaying only one or more items of the one or more user interface mechanisms that are contained in the registration file so that the one or more interface mechanisms conform with the context sensitive information of the group view selected by the user.

12. The method of claim 11, wherein selecting to open a group view is accomplished by double-clicking on a group view icon of the user interface.

13. The method of claim 11, wherein the one or more user interface mechanisms of the user interface comprise one or more menubars.

14. The method of claim 11, wherein the one or more user interface mechanisms of the user interface comprise one or more popup menus.

15. The method of claim 11, wherein the one or more user interface mechanisms of the user interface comprise one or more toolbars.

* * * * *